United States Patent
Bausen et al.

(10) Patent No.: US 8,481,884 B2
(45) Date of Patent: Jul. 9, 2013

(54) DEVICE AND METHOD FOR PRETREATING EXTERIOR SURFACES OF AN AIRCRAFT TO BE PAINTED

(75) Inventors: Dirk Bausen, Harsefeld (DE); Birgit Kuhlenschmidt, Hamburg (DE); Karl Hausmann, Hamburg (DE); Rolf Bense, Jork (DE); Daniel Lahidjanian, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 407 days.

(21) Appl. No.: 12/819,589

(22) Filed: Jun. 21, 2010

(65) Prior Publication Data

US 2010/0319618 A1    Dec. 23, 2010

Related U.S. Application Data

(60) Provisional application No. 61/218,895, filed on Jun. 19, 2009.

(30) Foreign Application Priority Data

Jun. 19, 2009   (DE) .......................... 10 2009 029 915

(51) Int. Cl.
*B23K 26/08* (2006.01)
*B23K 26/42* (2006.01)
*G06F 19/00* (2011.01)

(52) U.S. Cl.
USPC ................ 219/121.6; 219/121.8; 219/121.85; 700/117

(58) Field of Classification Search
USPC ................ 219/121.6, 121.8, 121.85; 700/117
See application file for complete search history.

(56) References Cited

U.S. PATENT DOCUMENTS

| | | | | |
|---|---|---|---|---|
| 4,844,947 A | * | 7/1989 | Kasner et al. | 427/510 |
| 7,897,214 B2 | * | 3/2011 | Poullos | 427/470 |
| 2008/0144675 A1 | * | 6/2008 | Spinelli et al. | 372/15 |

FOREIGN PATENT DOCUMENTS

WO    WO 2006/026240 A1    3/2006

* cited by examiner

*Primary Examiner* — Evan Pert
(74) *Attorney, Agent, or Firm* — Leydig, Voit & Mayer, Ltd.

(57) ABSTRACT

A device for pretreating an exterior surface of an aircraft coated with an aircraft-specific base material so as to prepare the surface for a final painting with aircraft paint includes a pretreating tool. The pretreating tool has a laser head configured to activate the aircraft-specific base material using a laser. The device also includes a support construction including a robot device and a control unit configured to control and move the laser head over the surface using the robot device.

20 Claims, 1 Drawing Sheet

DEVICE AND METHOD FOR PRETREATING EXTERIOR SURFACES OF AN AIRCRAFT TO BE PAINTED

CROSS REFERENCE TO PRIOR APPLICATIONS

Priority is claimed to German Patent Application No. DE 10 2009 029 915.7, filed Jun. 19, 2009 and to U.S. Provisional Application No. 61/218,895, filed Jun. 19, 2009. The entire disclosure of both applications is incorporated by reference herein.

FIELD

The invention pertains to a device and a method for pretreating exterior surfaces of an aircraft that are primed with an aircraft-specific base material in order to prepare the surface for final painting with an aircraft paint, wherein said device comprises a support construction for positioning a pretreating tool.

The field of application of the invention primarily concerns aircraft for transporting passengers or cargo that typically feature a large-volume fuselage, to which airfoils are laterally attached and on the tail of which an elevator unit and a rudder unit are arranged. Aircraft of this type are usually provided with a multilayer exterior paint. The exterior paint basically has several functions. On the one hand, it is intended to protect the exterior surfaces from corrosion; on the other hand, the exterior paint serves for creating the optical appearance of the entire aircraft and in this respect usually features decorative stripes, logos, letterings and other picture motifs. Since the exterior paint of an aircraft needs to fulfill the strictest quality requirements, a special surface activation with prior and subsequent solvent cleaning processes and subsequent dust binding are required before the application of the multilayer paint. The paint should be applied immediately thereafter.

BACKGROUND

WO2006/026240 A1 discloses a processing device for coating a rudder unit of an aircraft. A graphic picture motif is automatically applied onto a surface that is already finish-painted in one color by means of robots. The rudder unit is held in the upright position by a support platform. A gantry robot is provided to both sides of the rudder unit, wherein the three movable spatial axes of said gantry robot move an applicator with a plurality of fluid nozzles for pigmented ink in accordance with a control in order to apply the desired motif. The thusly applied pigmented ink is permanently hardened on the aircraft paint by means of subsequent polymerizing.

According to the public state of the art, the above-described surface painting with an optimal application of a picture motif requires an activation of the surface to be painted, wherein this surface activation is, according to the state of the art, carried out manually in the form of various cleaning and sanding steps.

In such a conventional surface activation, the primed surface to be painted usually is initially pre-cleaned with a solvent. Subsequently, the already applied primer is manually processed with pneumatically operated random orbital sanders in order to achieve an evenly sanded surface. Subsequent cleaning with a solvent and a final dust binding with special dust binding cloths then need to be carried out.

The disadvantage of this conventional manual surface activation is the high expenditure of labor associated therewith. In this case, quite large surfaces with curved geometry need to be processed as precisely as possible. With respect to a rudder unit, in particular, the attached rudder and the installed rivets are obstructive during this processing. The front edge of the rudder is usually covered in the center position and can only be processed by turning the rudder sideward as it is also required for the manual sanding process. The upper edge of a rudder unit usually has a very significant curvature and therefore needs to be manually processed from above. The front edge and the base of a rudder unit also have a quite significant curvature that requires corresponding manual oscillating movements of the random orbital sander. The antistatic arresters that are usually arranged on the rudder unit should not be processed during the manual sanding because they cannot be painted.

SUMMARY OF THE INVENTION

An aspect of the present invention is to develop a device and a method for pretreating the primed exterior surface of an aircraft prior to painting, wherein said device/method allows an activation of the surface to be painted with consistently high quality within a short processing time.

The invention includes the technical characteristic that the pretreating tool is realized in the form of a laser head for the laser activation of the aircraft-specific base material, wherein said laser head can be controlled and moved over the surface in accordance with a control unit by means of a support construction in the form of a robot device.

The advantage of the inventive solution can be seen, in particular, in that the applied laser technology creates a prerequisite for carrying out the entire pretreating process of the surface activation differently and in an automated fashion, namely by means of a robot device that is faster and more precise than manual activity. Due to the applied laser technology, surface obstructions that are normally present on the surface of an aircraft, e.g., rivets, covered edges and the like, no longer represent an obstacle. The usually curved surface—particularly of a rudder unit—can also be processed with consistent quality due to the flexible positioning of the laser head by means of robots. Investigations of the influence of the laser irradiation required for the inventive surface activation on the structure of the connecting elements showed that no negative changes of material properties could be detected, wherein the laser treatment surprisingly has, in particular, no effect on the strength of the connecting elements. One property of the inventive laser activation is that a removal with sharp contours takes place or, in other words, that layers of identical thickness are removed from the surface. In this case, the laser beam adapts itself to the contour of the surface. This requires that the surface to be pretreated with the inventive solution already is sufficiently smooth. The surface quality achieved over the very large aircraft surface as a result of the laser activation also can be automatically monitored with sensor technology, wherein the robot device may carry corresponding sensor means in addition to the laser head for this purpose.

The laser head should preferably comprise at least one pulsed $CO_2$ laser as pretreating tool. An arrangement of several of these $CO_2$ lasers adjacent to one another enlarges the effective surface of the laser head and contributes to a more efficient surface treatment. Only a few laser pulses per surface unit are directed at the surface with this $CO_2$ laser in order to achieve a sufficient pretreatment prior to painting. This significantly increases, in particular, the adhesive strength of the paint layer.

According to another measure that enhances the invention, it is proposed that the robot device is realized in the form of a gantry robot with three linearly and/or rotationally movable spatial axes for positioning and moving the laser head line-by-line relative to the curved surface of the aircraft to be processed. Such a gantry robot can be efficiently utilized, particularly for the surface of rudder units. It would also be conceivable to realize the robot device in accordance with a multi-axial industrial robot in order to reach surface contours that are particularly difficult to access.

The base material to be activated on the surface of the aircraft may be realized in different ways. A base material, in particular, in the form of an antistatic paint, an anti-erosion paint, a primer or a sealing compound can be subjected to the inventive surface activation. In addition, it would also be conceivable to pretreat substrates in the form of primed composite materials by means of laser activation.

The laser activation of comparatively large surfaces in the construction of aircraft and the special base materials used for this purpose require special process parameters in order to achieve the desired pretreating result. It is therefore proposed that the laser head generates an energy of 3.5-5 Joule are pulse. The focal spot area should, if possible, lie in the range between 1-5 $cm^2$. The adjustable parameters energy and focal spot area should result in an energy density that preferably lies in the range between 1-5 Joule per $cm^2$. A particularly effective laser activation of the special base materials of interest in this context can be carried out within this range of values.

The inventive laser activation method can be implemented in the form of a routine for the coordinated control of the laser head and the robot device, namely with corresponding control commands stored in software, and stored in a central control unit of the device that preferably consists of a normal computer with assigned memory unit. This software initiates the above-described technical effects of a laser activation in connection with the inventive device.

BRIEF DESCRIPTION OF THE DRAWINGS

Other measures that enhance the invention are elucidated in greater detail below with reference to the drawings, namely in connection with the description of one preferred exemplary embodiment of the invention. In these drawings.

DETAILED DESCRIPTION

Figure 1:
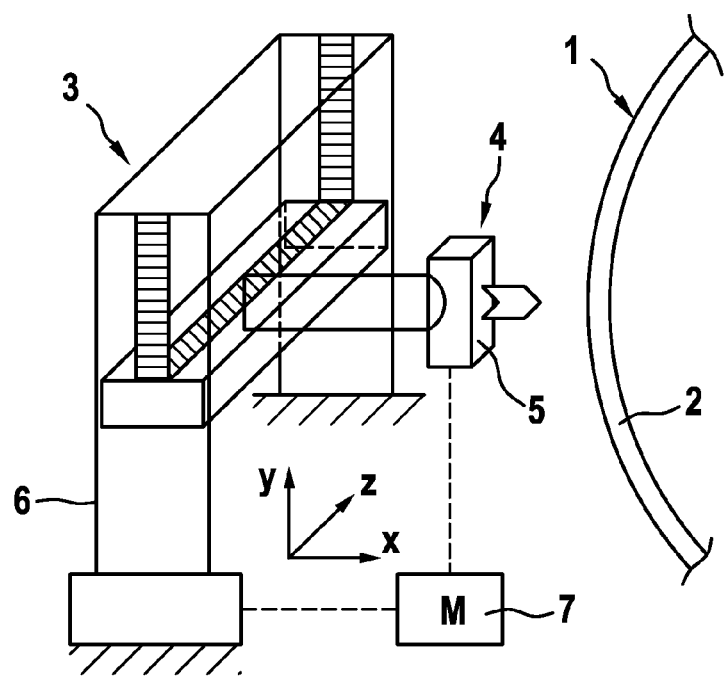
FIG. 1 shows a schematic representation of a device for pretreating exterior surfaces of an aircraft.

According to FIG. 1, the device for pretreating exterior surfaces 1 of an aircraft fuselage 2—that is only illustrated sectionally in this figure—consists of a support construction 3 that is equipped with a pretreating tool 4. The pretreating tool 4 is realized in the form of a $CO_2$ laser that comprises a laser head 5, in which a transformer for generating the laser energy is also accommodated. In this case, the laser head 5 provides an energy density of approximately 5 Joule per $cm^2$ for the laser treatment of the surface 1.

The support construction 3 of the pretreating tool 4 comprises a robot device 6 that is realized in the form of a gantry robot with three linearly movable spatial axes X, Y and Z. The individual spatial axes X, Y and Z are formed by electromotive linear drives that are controlled by means of a control unit 7. The control unit 7 ensures a coordinated control of the robot device 6 together with the laser head 5 for the activation of the surface 1. This coordinated control manifests itself in a line-by-line movement of the laser head 5 relative of the surface 1 of the aircraft fuselage 2 to be processed.

The thusly realized laser activation refers to the aircraft-specific base material that forms the coating of the structural element of plastic, in this case the aircraft fuselage 2.

Figure 2:
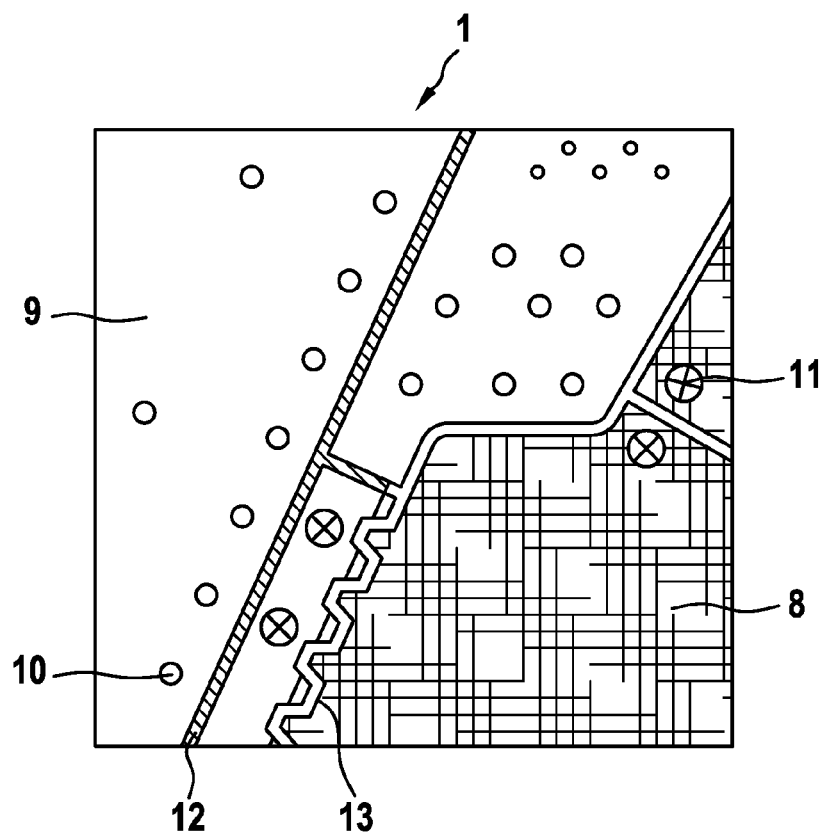
FIG. 2 shows a schematic representation of a surface section.

According to FIG. 2, the surface 1 consists of different regions with different base materials. For example, a substrate in the form of a glass-fiber reinforced plastic is coated with an antistatic paint 8 in a first region—that is illustrated with a hatching.

In a second region—that is illustrated without a hatching—a substrate in the form of a carbon-fiber reinforced plastic is coated with a base material in the form of a primer 9. In addition to these large-surface areas, the laser activation also concerns connecting elements 10 that are used for mounting panels and usually consist of rivets. Detachable panel elements mounted with screws 11 are also subjected to the laser activation in the head region. Furthermore, the laser activation also takes place on a sealing compound 12 that is situated in joints between adjacent panel elements. Panel elements that are movably attached to the surface 1 by means of hinges 13 are also subjected to the laser activation.

As a supplement, it should be noted that "comprising" does not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

LIST OF REFERENCE SYMBOLS

1 Surface
2 Aircraft fuselage
3 Support construction
4 Pretreating tool
5 Laser head
6 Robot device
7 Control unit
8 Antistatic paint
9 Primer
10 Connecting element
11 Screw
12 Sealing compound
13 Hinge
X First spatial axis
Y Second spatial axis
Z Third spatial axis

What is claimed is:

1. A device for pretreating an exterior surface of an aircraft coated with an aircraft-specific base material so as to prepare the surface for a final painting with aircraft paint, the device comprising:
   a pretreating tool including a laser head configured to activate the aircraft-specific base material using a laser;
   a support construction including a robot device; and
   a control unit configured to control and move the laser head over the surface using the robot device,
   wherein the base material includes an antistatic paint, an anti-erosion paint, a primer, a sealing compound, or a combination of one or more of any of these.

2. The device as recited in claim 1, wherein the laser head includes a pulsed $CO_2$ laser.

3. The device as recited in claim 1, wherein the exterior surface of the aircraft includes a curved surface,
   wherein the robot device includes a gantry robot including three linearly, rotationally, or linearly and rotationally movable spatial axes, and
   wherein the gantry robot is configured to position and move the laser head line-by-line relative to the curved surface.

4. A method for pretreating an exterior surface of an aircraft coated with an aircraft-specific base material so as to prepare the surface for a final painting with an aircraft paint, the method comprising:
   providing a laser head configured to activate the base material using a laser emitted from the laser head and a robot device; and
   controlling and uniformly moving the laser head over the surface using the robot device controlled by a control unit so as to activate the base material,
   wherein the controlling and uniformly moving of the laser head includes processing at least one of a connecting element, a hinge, a sealing compound, and a surface coated with primer, disposed on the exterior surface of the aircraft, without changing any laser parameters, and
   wherein the base material includes an antistatic paint, an arid-erosion paint, a primer, a sealing compound, or a combination of one or more of any of these.

5. The method as recited in claim 4, wherein the controlling and uniformly moving of the laser head includes processing a connecting element.

6. The method as recited in claim 4, wherein the exterior surface of the aircraft includes a substrate including at least one of a composite material fiber-metal laminate, a carbon-fiber reinforced plastic and a glass-fiber reinforced plastic.

7. The method as recited in claim 4, further comprising generating an energy of between 3.5 and 5 Joules per pulse using the laser head.

8. The method as recited in claim 4, further comprising generating a focal spot area of between 1 and 5 cm$^2$ using the laser head.

9. The method of claim 4, further comprising generating an energy density of between 1 and 5 Joules per cm$^2$ using the laser head.

10. A computer program product of a control unit of a device for pretreating an exterior surface of an aircraft coated with an aircraft-specific base material so as to prepare the surface for a final painting with aircraft paint, the program product comprising a computer usable medium having a computer readable program code configured to:
    activate the base material using a laser emitted from the laser head; and
    control and uniformly move the laser head over the surface using a robot device controlled by a control unit so as to activate the base material,
    wherein to control and uniformly move the laser head includes processing at least one of a connecting element, a hinge, a sealing compound, and a surface coated with primer, disposed on the exterior surface of the aircraft, without changing any laser parameters, and
    wherein the base material includes an antistatic paint, an anti-erosion paint, a primer, a sealing compound, or a combination of one or more of any of these.

11. The method as recited in claim 4, wherein the base material includes an antistatic paint.

12. The method as recited in claim 4, wherein the base material includes an anti-erosion paint.

13. The method as recited in claim 4, wherein the base material includes a primer.

14. The method as recited in claim 4, wherein the base material includes a sealing compound.

15. The method as recited in claim 4, wherein the controlling and uniformly moving of the laser head includes processing a hinge.

16. The method as recited in claim 4, wherein the controlling and uniformly moving of the laser head includes processing a sealing compound.

17. The method as recited in claim 4, wherein the controlling and uniformly moving of the laser head includes processing a surface coated with primer.

18. The device as recited in claim 1, which is configured such that the antistatic paint, the anti-erosion paint, the primer, and the sealing compound are activated without changing any laser parameters.

19. The device as recited in claim 1, which is configured to generate an energy of between 3.5 and 5 Joules per pulse with the laser head.

20. The device as recited in claim 1, which is configured to generate a focal spot area of between 1 and 5 cm$^2$ using the laser head.

* * * * *